Nov. 15, 1966   L. R. KRUEGER   3,285,625
QUICK COUPLER
Filed Dec. 29, 1964   2 Sheets-Sheet 1
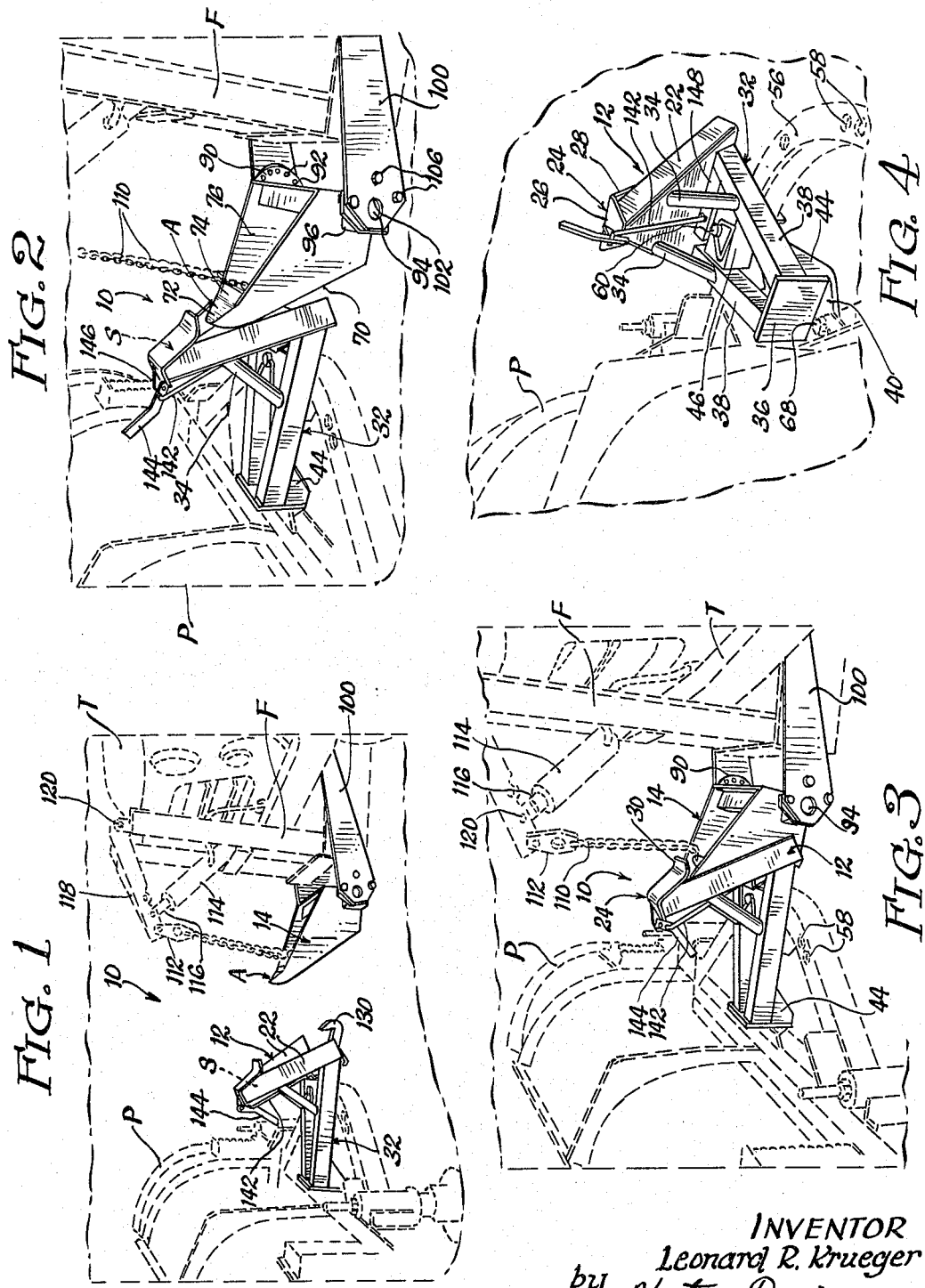
INVENTOR
Leonard R. Krueger
by Horton, Davis,
Brewer & Brugman
Attys Nov. 15, 1966   L. R. KRUEGER   3,285,625
QUICK COUPLER
Filed Dec. 29, 1964   2 Sheets-Sheet 2
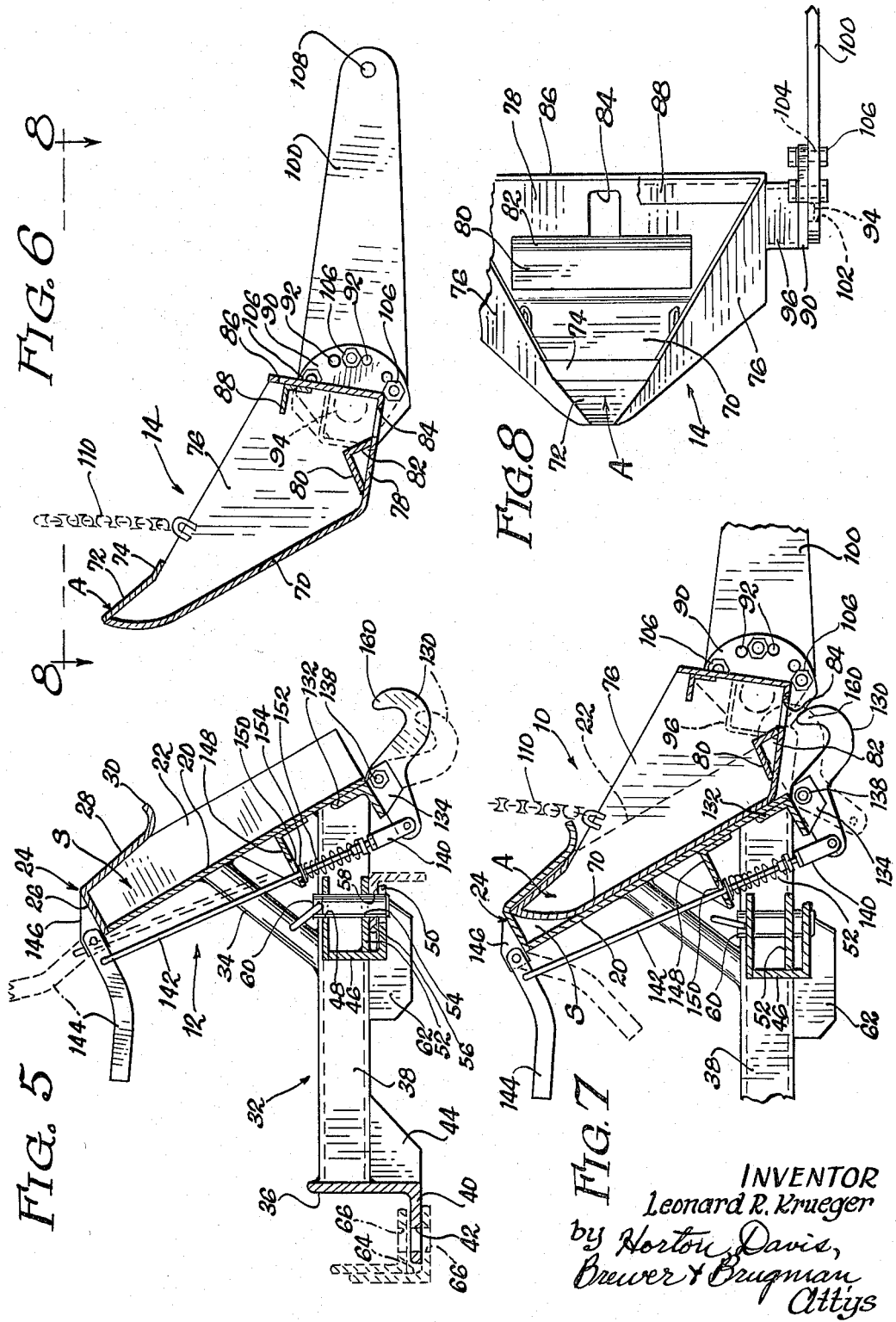
INVENTOR
Leonard R. Krueger
by Horton, Davis,
Brewer & Brugman
Att'ys

United States Patent Office 3,285,625
Patented Nov. 15, 1966

3,285,625
QUICK COUPLER
Leonard R. Krueger, Wausau, Wis., assignor to Wausau
Iron Works, Wausau, Wis., a corporation of Wisconsin
Filed Dec. 29, 1964, Ser. No. 421,882
7 Claims. (Cl. 280—479)

This invention relates to means for quickly coupling an implement to a prime mover.

In many arts prime movers are used to operate implements. Quite frequently it is desirable to utilize a single prime mover with a variety of implements and also to use the prime mover without any implement. Examples of that are to be found in the agricultural arts and in the road building and road clearing arts, among others. As a specific example implements such as snow plows are frequently powered by trucks which are used for other purposes when they are not being used to operate snow plows.

In providing means for coupling implements such as snow plows, and prime movers such as trucks, it is desirable and practically necessary to provide a coupling means for releasably connecting the two. The simpler the construction of the coupling means and the more rapid the connection and release of the coupled implement and prime mover, the more advantageous is a given coupling means. It is also desirable that the coupling be automatic, preferably by a single operator from within the prime mover itself. To minimize labor costs and to provide for the fullest utilization of the prime mover it is also important that the prime mover be easily and rapidly disconnected by a single operator. The quick coupling means of this invention provide those and other desired results.

In accordance with this invention coupling means are provided which include a pair of cooperable coupling members one of which is connected to an implement, the other of which is connected to a prime mover. The implement coupling member defines a cavity for receiving a segment of the prime mover coupling member and provides means for contacting the prime mover coupling member for guiding said segment into said cavity. Locking means on said coupling members remote from said cavity and said segment are provided to automatically but releasably interlock said coupling members when said segment is received within and confined by said cavity.

It is therefore an object of this invention to provide novel releasably connectable coupling means for coupling an implement to a prime mover in which said coupling means comprises a first coupling member connectable to an implement and defining a socket for receiving a portion of a second coupling member articulatably mountable on a prime mover and means for releasably locking said first and second coupling members when said socket has received said portion of said second coupling member.

A further object of this invention is to provide novel coupling means comprising a first coupling member defining a socket connectable to an implement and a second coupling member defining an insertable segment articulatably connectable to a prime mover in which said insertable segment is receivable within said socket, and means for releasably locking said first coupling member to said second coupling member when said insertable segment is received within said socket and is confined thereby.

Yet another object contemplated by this invention is the provision of a cooperable pair of coupling members releasably lockable to each other, the first of said coupling members being connectable to an implement and the second of said coupling members being movably mountable on a prime mover, said first coupling member comprising guide means and defining a cavity means in an upper portion thereof, said second coupling means comprising a projection at an upper portion thereof, said projection being movable with said second coupling member by said prime mover into said cavity means, said first and second coupling members being automatically releasably locked to each other at portions remote from said cavity means and said projection when said projection is moved into mating engagement with said cavity means by said prime mover.

These and other objects and advantages of this invention will become apparent from the following description and drawings of which:

FIGURE 1 illustrates an exemplary coupling means of this invention and shows a first coupling member adapted to receive a second coupling member, the first being connected to an implement, the second being articulatably mounted on a prime mover;

FIG. 2 shows the first and second coupling members of FIG. 1 in position to be moved into their coupling relationship;

FIG. 3 shows the first and second coupling members of FIG. 1 in their coupling relationship;

FIG. 4 is a front perspective view of the first coupling member of FIG. 1;

FIG. 5 is an enlarged side sectional view of the first coupling member of FIG. 1;

FIG. 6 is an enlarged side sectional view of the second coupling member of FIG. 1;

FIG. 7 is an enlarged side sectional view of the releasably interlocked coupling members of FIG. 3; and FIG. 8 is a partial plan view taken substantially along line 8—8 of FIG. 6.

First referring to FIGS. 1 to 3, a coupling means 10 of this invention is shown as including a first coupling member 12 and a second coupling member 14. First coupling member 12 is secured to an implement such as the snow plow P illustrated while the second coupling member is articulatably mounted on a prime mover such as the truck T illustrated. Snow plow P and truck T may be of any conventional type. The specific details thereof form no part of this invention except insofar as they cooperate with coupling means 10 to connect members 12 and 14 and to operate an implement.

First member 12 comprises a generally triangular guide plate 20, rectangular upwardly converging spacer means such as side plates 22 and a cap member 24, generally L-shaped when viewed from the side. Cap member 24 includes an upper trapezoidal cover segment 26, a downwardly extending rear plate segment 28 and a downwardly and rearwardly extending arcuate lip 30. Side plates 22, cap member 24 and guide plate 20 cooperate to define an open-bottomed cavity or socket S.

At its front, first member 12 is provided with a support structure for securing it to snow plow P. As seen in FIG. 4 guide plate 20 is connected as by welding to an A-frame 32 and struts 34. A-frame 32 includes a vertical head plate 36 and two diverging legs 38 connected at their ends to guide plate 20. Struts 34 are secured as by welding to both legs 38 and guide plate 20. At its lower horizontal edge, head plate 36 is secured to a pivot plate 40 defining an aperture 42. Vertical gussets 44 welded to vertical head plate 36 and legs 38 serve to reinforce and strengthen the forward end of A-frame 32.

The cross member of A-frame 32 includes a rearwardly opening generally U-shaped channel member 46 welded between legs 38. The upper arm of channel member 46 defines an opening 48 while the lower arm defines a notch 50. A cross plate 52 secured as by welding between legs 38 adjacent their lower edges lies parallel to and between the arms of channel member 46. Cross plate 52 is provided with an aperture 54 aligned with opening 48 and notch 50. Plate 52 is spaced from the lower arm of channel member 46 to receive a flange member 56 of snow plow P.

As best seen in FIG. 5, flange member 56 is provided with apertures 58 alignable with opening 48, notch 50 and aperture 54 to receive a removable pin 60 for positively positioning the cross member of A-frame 32 with respect to flange member 56 and snow plow assembly P. Reinforcing gussets 62 are welded to legs 38 and the lower arm of channel member 46 to stabilize the interconnection therebetween.

Pivot plate 40, as best seen in FIG. 5, is adapted to be positioned between a member defining a U-shaped channel 64 which is provided with openings 66 alignable with aperture 42. By inserting a removable pin 68 in aligned openings 66 and aperture 42 and by providing pin 60 in the apertures and openings just described, a substantially rigid interconnection between snow plow P and the first coupling member 12 is provided.

Second coupling member 14 comprises a front guide plate 70, a converging upper rear plate 72 having a rearwardly and downwardly inclined end segment 74, and upwardly converging side segments 76. Together they define a generally hollow insertable segment or projection A for a purpose to be described.

In its lower regions second coupling member 14 includes a generally horizontally disposed base plate 78. An inverted L-shaped channel 80 is secured by its outer extremities to base plate 78. Adjacent leg 82 of channel 80 a slot 84 in base plate 78 is provided. A vertical wall 86 is connected to the rear end of base plate 78 and to the rear ends of side segments 76 and a reinforcing channel 88 is secured, as by welding, to side segments 76 and to vertical wall 86.

At its lower end and at its outside surface second coupling member 14 is provided with mounting plates 90. Plates 90 define spaced openings 92 and include projecting cylindrical stub axles 94. Mounting plates 90 are spaced from and secured to second coupling member 14 by spacers 96.

As previously stated, second coupling member 14 is articulatably movably supported upon a prime mover such as truck T. Support is provided adjacent the lower end of, and adjacent projection A of the second coupling member 14. At the lower end of member 14 pivotally mounted arms 100 are provided. Adjacent their forward ends, arms 100 define bearing openings 102 and locking apertures 104 alignable with stub axles 94 and spaced openings 92, respectively. By selecting appropriate openings 92 and aligning them with locking apertures 104 and then inserting locking nuts and bolts 106, the angular disposition of second coupling member 14 with respect to arms 100 may be adjusted to the desired relationship.

The rear ends of arms 100 are provided with apertures 108 (FIG. 6) for pivotally mounting arms 100 on a pivot rod (not shown) beneath truck T.

Adjacent projection A, link chains 110 are secured to side segments 76 as by welding. Chains 110 are releasably connected to suspension plates 112 which in turn are operatively connected to an operating means for second coupling member 14. To support the operating means a frame F is provided on truck T.

As seen in FIG. 1 the operating means includes a hydraulically operable cylinder 114 and a piston 116. Piston 116 is pivotally connected to a suspension arm 118 while cylinder 114 is pivotally connected at its end remote from piston 116 to frame F. Suspension arm 118 is pivotally connected to frame F as at 120 and at its other end pivotally supports suspension plates 112. Slots are provided in suspension plates 112 to receive and retain chains 110 and preselected links thereof. Extending and retracting piston 116 raises and lowers suspension arm 118 and the suspended second coupling segment, pivoting it about the axis provided by rear end apertures 108 in pivotally mounted arms 100.

To releasably lock the first and second coupling members to each other, the first is provided with a pivotally mounted hook 130. As seen in FIG. 5 a bracket 132 having a depending leg 134 is secured to the lower portion of triangular guide plate 20. Leg 134 defines an opening alignable with a complementary opening in hook 130 for receiving a pivot pin 138. Adjacent its remote end hook 130 is straddled by the arms of a pivotally connected forked member 140 which in turn is secured to one end of an elongated operating rod 142. The other end of operating rod 142 is bent at a right angle, the terminal portion of which is received in an aperture in a handle 144 and is retained therein by a cotter pin (not shown). Handle 144 is pivotally mounted on a bracket 146 secured as by welding to the cover segment 26 of cap member 24.

A channel 148 is secured to the front of triangular guide plate 20. Channel 148 defines a slot 150 to receive and accommodate operating rod 142 in the varying positions of hook 130 and handle 144. A compression spring 152 surrounds operating rod 142 between a retaining washer 154 lying beneath bracket 148 and forked member 144 to normally urge the end 160 of hook 130 upwardly into the position shown in dotted line in FIG. 7. The hook may be retracted to the positions shown in full line in FIG. 7 and in dotted line in FIG. 5 by moving handle 144 upwardly to the positions shown in full line in FIGS. 5 and 7 and in dotted line in FIG. 5. Normally, however, when the coupling means of this invention is in use, the hook end 160 assumes the position shown in dotted line in FIG. 7 and in full line in FIG. 1.

To utilize the coupling means of this invention the first coupling member 12 is secured in the manner described to an implement such as the snow plow illustrated. The coupled angular disposition of the implement P with respect to the prime mover T is selected by utilizing the appropriate opening 58 in flange member 56 for engagement with pin 60. Handle 144 and operating rod 142 are then positioned as shown in FIG. 1 and in dotted line in FIG. 7. The second coupling member 14 is then secured to truck T in the manner described, the angle it is to assume with respect to arms 100 being selected by utilizing the appropriate spaced openings 92 in mounting plates 90. The openings should be chosen so that when the coupling members are interengaged in the manner shown in FIG. 7, guide plate 20 and front plate 70 lie parallel to each other with the implement in its proper aspect with respect to the surface upon which it is to operate.

With the first and second coupling members 12 and 14 in the positions just described, truck T is moved toward implement P from a spaced position such as that of FIG. 1 to a position in which coupling members 12 and 14 are closely adjacent such as seen in FIG. 2. It is important that piston 116 be retracted sufficiently to allow projection A to pass beneath lip 30 of cap member 24.

As coupling member 14 is moved into contact with coupling member 12 side plates 22 serve to guide coupling member 14 inwardly of coupling member 12 until member 14 contacts guide plate 20. At that point piston 116 is extended and guide plate 20 guides member 14 upwardly until projection A is fully received within and confined by socket S. Piston 116 is further extended, if necessary, until guide plate 20 and front guide plate 70 contact each other throughout the greater part of their vertical extent. Front plate 70 throughout most of its extent is of substantially the same lateral dimensions as triangular guide plate 20. As such the contact between plates 20 and 70 is of considerable length and width adjacent their lower ends providing stability between members 12 and 14 when they are interlocked and resisting relative rotation of the socket S and projection A.

As member 14 approaches member 12 and during the penetration of the cavity by the insertable segment of member 14, the hook end 160 contacts first the front plate 70 and then the base plate 78 of member 14. Front plate 70 and base plate 78 automatically cam end 160 of hook 130 downwardly against the force of spring 152 to about the position shown in full line in FIG. 7 until hook end 160 reaches slot 150 in base plate 78. At that point spring 152 automatically urges the hook end through slot 150 and into hooking engagement with channel member 80 and base plate 78.

Therefore when projection A is confined within socket S, remote portions of members 12 and 14 will have been automatically but releasably interlocked. They will remain interlocked until it is desirable to disengage the prime mover and implement, at which time hook end 160 may be withdrawn by moving handle 144 to one of the positions shown in FIG. 5. Then piston 116 may be retracted until projection A is in a position such as that shown in FIG. 2 and the prime mover may be backed away from the implement and the first coupling member, thereby separating the first and second coupling members of coupling means 10.

While a specific embodiment of this invention has been described as required by the patent laws, it is apparent that many modifications in structure and in detail may be made without departing from the spirit of this invention. Accordingly it is not my intention to be limited to the precise exemplary structure illustrated and described above.

I claim:

1. A quick coupling means for automatically releasably connecting an implement to a prime mover comprising a first coupling member adapted to be connected to an implement, said first coupling including an elongated front guide means, a spaced rear plate, and upwardly converging spacer means for spacing said front guide means and rear plate and for defining with said front guide means and said rear plate a generally vertical open-bottomed cavity, a second coupling member adapted to be connected to a prime mover for movement into and out of engagement with said first coupling member, said second coupling member including an upper projection and a front guide plate engageable with said front guide means for slidably guiding said projection into confining reception by said cavity, and means secured to said quick coupling means remote from said cavity and said projection for automatically releasably interlocking said cavity and projection when said projection is moved into confining reception within said cavity.

2. A quick coupler for connecting an implement to a prime mover comprising a first coupling member adapted to be connected to an implement and a second coupling member adapted to be connected to a prime mover and to be moved by a prime mover into and out of engagement with said first coupling member, means secured to said first coupling member for connecting said first coupling member to an implement, said first coupling member having a front guide means, rearwardly extending spacer means and a rear socket plate interconnected at an upper portion of said first coupling member to define an open-bottomed socket, said front guide means extending beneath said socket, means secured to said second coupling member for connecting said second coupling member to a prime mover, said second coupling member having an upper insertable segment proportioned to be received within and to be confined by said socket, said insertable segment being guidable into confining reception within said socket by said front guide means when said second coupling member is moved by a prime mover into engagement with said first coupling member, and means secured to said quick coupler for releasably locking said first and second coupling members to each other at portions remote from their respective upper portions when said insertable segment is confined within said socket.

3. A quick coupling means comprising a first coupling member connectable to an implement and a second coupling member articulatably mountable on a prime mover for quickly coupling an implement and a prime mover, said first coupling member including an elongated front guide means and defining a socket which is closed at its upper end and is open at its bottom end, said socket being circumscribed by an upper portion of said front guide means, a spaced rear socket plate and by upwardly converging side plates, said second coupling member including an insertable segment in an upper portion thereof, said second coupling member being engageable with said front guide means for guiding said insertable segment into confining reception within said socket, and means remote from said insertable segment and said socket for releasably locking said first and second coupling members to each other when said insertable segment is confined within said socket.

4. The quick coupling means of claim 3 in which said means for releasably locking said first and second coupling members includes a rearwardly facing hook connected to said first coupling member.

5. A quick coupling means comprising a first coupling member connectable to an implement and a second coupling member articulatably mountable on a prime mover for quickly coupling an implement and a prime mover, said first coupling member including an elongated front guide means and defining a socket, said second coupling member including an insertable segment in an upper portion thereof, said second coupling member being engageable with said front guide means for guiding said insertable segment into confining reception within said socket, and means remote from said insertable segment and said socket for releasably locking said first and second coupling members to each other when said insertable segment is confined within said socket, said remote means comprising a rearwardly facing hook connected to said first coupling member, said hook being normally biased by a spring into a locking position and being cammable out of said locking position by said second coupling member as said insertable segment is guided into confining reception within said socket, after which the said spring urges said hook into said locking position to releasably lock said first and second coupling members to each other.

6. A quick coupler comprising first and second coupling members one connectable to an implement and the other connectable to a prime mover, said second coupling member including an upwardly projecting insertable segment having an extended face portion and an outer tip portion, said first coupling member being provided with an open-bottom socket portion arranged to conform with, and confiningly receive therein, said outer tip portion, and an elongated front guide means extending downwardly from said socket portion, said guide means being adapted to direct said outer tip portion of said insertable segment into confining engagement in said socket and being conformably shaped to accept said extended face in bearing relationship when said first and said second coupling members are operatively coupled to restrain said first and second coupling members from relative rotational movement, and means remote from said insertable segment and said socket for releasably locking said first and second coupling members to each other when said insertable segment is confined within said socket.

7. A quick coupling means for releasably connecting an implement to a prime mover comprising a first coupling means having means for securing said first coupling means to an implement, said first coupling means including a front guide plate, a rear plate and means for spacing said front guide and rear plates to define a socket adjacent one end of said first coupling means, a second coupling means having means for supporting said second coupling means upon a prime mover at at least two spaced points, said second coupling means comprising a projection at one end thereof complementary to said socket for movement into and out of said socket, pivotally mounted hook means remote from said socket and secured to said first coupling member spring biased into a first locking position and cammable by said second coupling member into a second open position as said projection enters and is received by said socket, and automatically returnable to said first locking position when said projection fully enters and is confined within said socket for locking said first and second members to each other at a position remote from said socket and projection, and manual means for moving said hook to said second open position to release said first and second members.

References Cited by the Examiner

UNITED STATES PATENTS

| | | | |
|---|---|---|---|
| 2,804,315 | 8/1957 | Guye | 280—477 |
| 3,116,075 | 12/1963 | Hershman et al. | 280—479 |
| 3,124,372 | 3/1964 | Poole | 280—477 |

LEO FRIAGLIA, *Primary Examiner.*